Dec. 31, 1968 S. LE ROY CARNS 3,418,828
SHIELDED ANGULAR DRIVE ASSEMBLY
Filed Jan. 9, 1967 Sheet 1 of 2
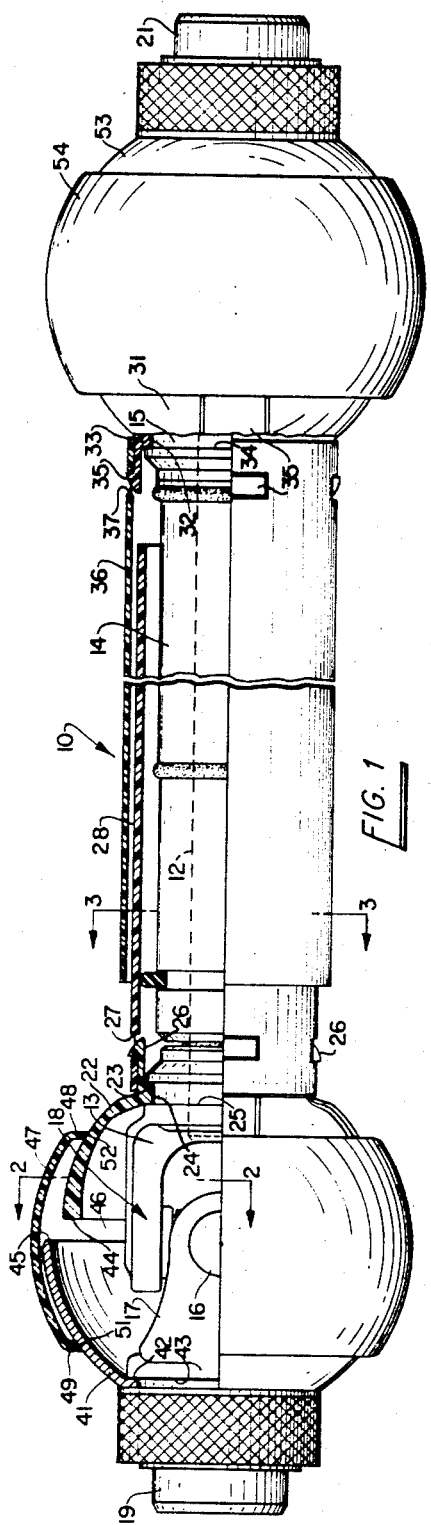
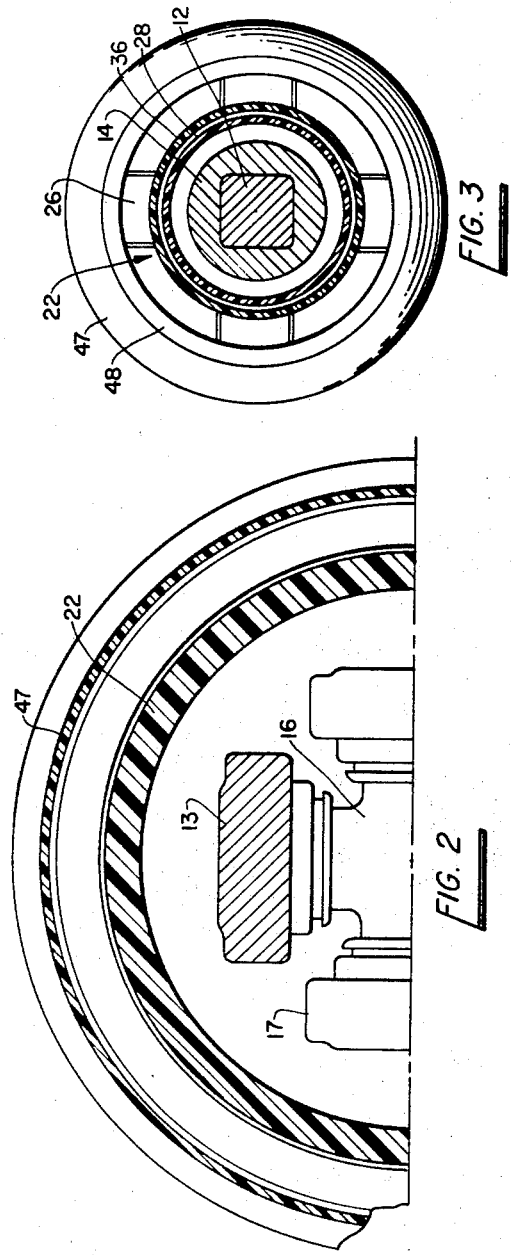
INVENTOR
Sidney Leroy Carns
BY *Strauch, Nolan, Neale, Nies & Kurz*
ATTORNEYS

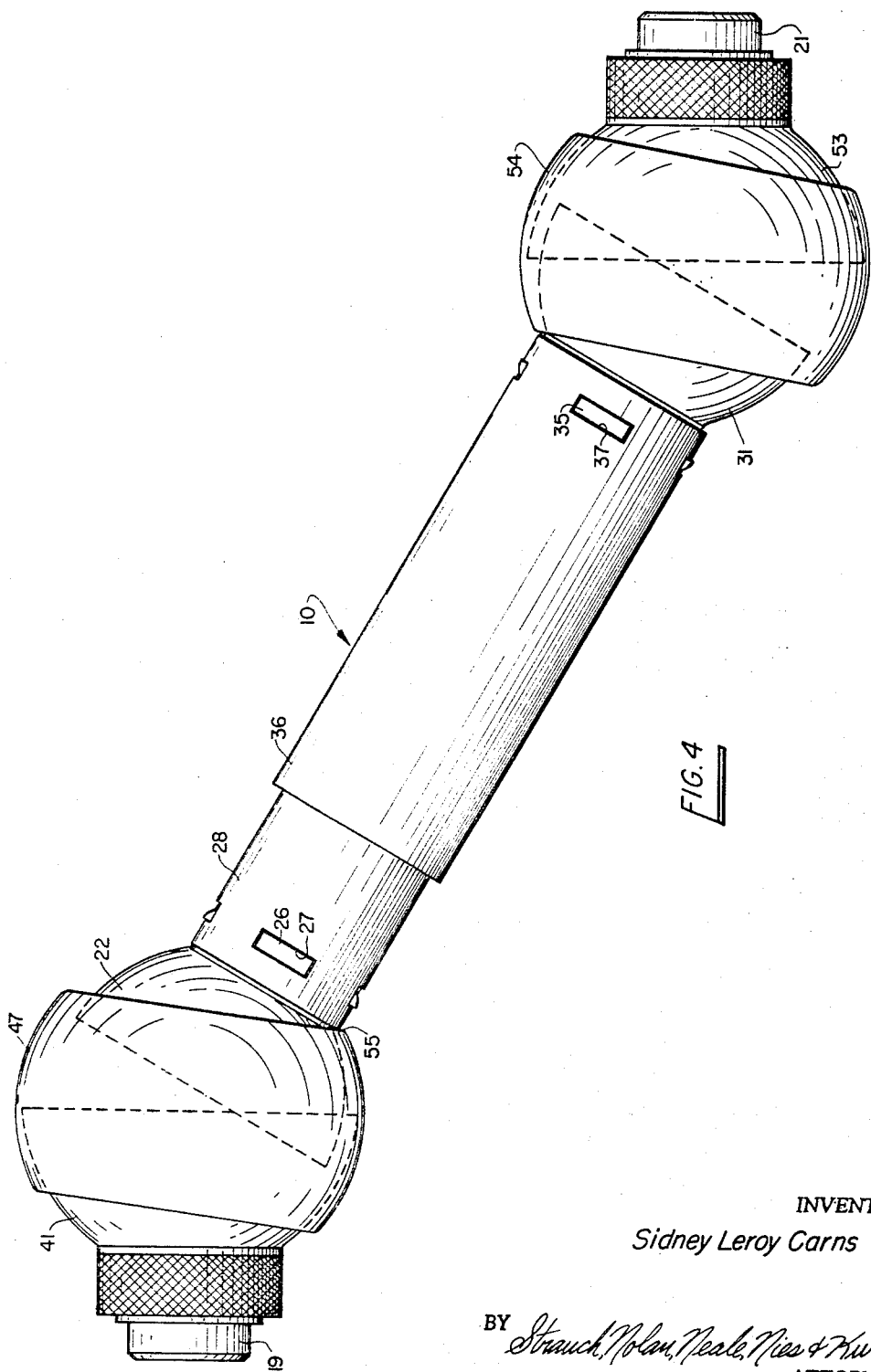

United States Patent Office 3,418,828
Patented Dec. 31, 1968

3,418,828
SHIELDED ANGULAR DRIVE ASSEMBLY
Sidney Le Roy Carns, Allegan, Mich., assignor to North American Rockwell Corporation, a corporation of Delaware
Filed Jan. 9, 1967, Ser. No. 607,977
10 Claims. (Cl. 64—32)

ABSTRACT OF THE DISCLOSURE

A drive transmitting universal joint wherein two end members are interconnected for relative angular movement has protective external shielding that comprises opposed bell-shaped shield members of different size fixed to the respective joint members and extending toward each other over the joint members to terminate in adjacent open ends with the smaller capable of extending within the larger upon joint irregularity, and an annular shield member is mounted upon and bridges the opposed shield members, the annular shield member having annular resilient lips at opposite ends in sliding association with the external surfaces of the opposed shield members to provide and maintain enclosure of the joint by the shielding during all operative conditions of angularity of the joint.

*Cross-reference to related application*

Ser. No. 468,291, filed June 30, 1965, now Patent No. 3,344,618.

*Background of invention*

The field of the invention extends to any universal or angularly changeable joint arrangement for which a protective external shield is desired to enclose the joint during all conditions of angularity. While the invention is specifically disclosed for universal joints of the type wherein end yokes are pivoted to a cross member, it may be applied to other joints such as shown in U.S. Patent No. 3,203,202.

The prior art has long recognized the advantage of and has suggested the shielding of universal joints.

Power takeoff shafts in agricultural machines for example usually comprise an exposed intermediate short drive transmitting shaft connected at opposite ends by universal joints to respective drive and driven shafts. It has been general practice to provide some sort of protective shield along and around the exposed shaft extending partly over the universal joints to prevent damage to the shaft and avoid injury to the operator. However, no effective and economically feasible means has been devised to completely cover the universal joints which may cause serious injury if the operator's clothing is caught in the rotating joint. It has been proposed to provide bell-shaped shields on the opposite yokes of the universal joints but these usually only partly cover the joints with a gap between them. In constructions where such shield bells may extend to overlap over the joint the angular displacement usually becomes limited thereby so that the assembly is not adaptable to high angle operations. Further, elaborate and costly fastening arrangements had to be provided for the shield bells in most prior art constructions.

*Summary of invention*

The invention provides a composite external shield structure for a universal or like joint wherein the joint parts are protectively shielded during all conditions of angularity. More specifically, a suitable boot externally bridges the open ends of shield bells carried by the yokes or other angularly displaceable end members of a universal joint and maintains sealing engagement with the relatively moving bells surfaces and closure of the gap between the bell ends. The invention is particularly adaptable to vehicle drive systems such as power take-off shafts for agricultural equipment, and the shielding helps protect the operator against accidental contact with exposed rotating drive elements.

It is the major object of the invention to provide for a drive transmitting or like joint wherein the joint elements are connected for relative angularity a novel composite external protective shield structure adapted to be installed on the joint elements and operative to maintain enclosure of the joint during all conditions of joint angularity.

A more specific object of the invention is to provide, for a universal joint of the type wherein opposed end members such as yokes are pivotally interconnected, a novel composite shield structure comprising bells mounted on the members with their open ends extending toward each other over the joint and a surrounding boot supported wholly on the bells and maintaining a bridge over the gap between the bells as they move relatively during changing angularity in the joint. Pursuant to this object the boot is a flexible unit having flexible side flanges providing resilient annular mouths engaging the respective bell surfaces which are preferably of substantially spherical contour.

Further objects will become apparent by reference to the specific disclosure and claims directed to the invention.

*Brief description of drawings*

FIGURE 1 is a side elevation partially broken away and sectioned showing the shield assembly of the invention in a preferred embodiment;

FIGURE 2 is a fragmentary section through the universal joint shield substantially on line 2—2 of FIGURE 1;

FIGURE 3 is a section through the assembly of FIGURE 1 substantially along line 3—3 of FIGURE 1; and FIGURE 4 is a side elevation showing the shielded shaft assembly of FIGURE 1 in an extreme articulated position.

*Preferred embodiments*

Referring to FIGURE 1, the assembly 10 comprises a shaft 12 extending rigidly from a universal joint yoke 13 to be slidably telescoped within a shaft 14 extending rigidly from a universal joint yoke 15. As shown in FIGURE 3, shaft 12 is substantially rectangular in section and disposed within the similarly shaped bore of shaft 14. Yoke 13 is connected by cross member 16 to a yoke 17 to form a universal joint at 18 at one end of the assembly having a drive shaft 19. Yoke 15 is connected to form part of a similar universal joint at the other end of the assembly having a driven shaft 21. The slidable shaft relationship at 12, 14 compensates for changes in distance between the universal joints during angularity in a known manner.

A substantially hemispherical shield bell 22 is mounted on yoke 13, as by a mounting section 23 formed with an internal flange 24 fitting into an annular recess 25 on the yoke. A plurality of flexible lobes or tangs 26 extend longitudinally from the mounting section to lockingly interfit with a corresponding plurality of circumferentially distributed slots 27 formed in a cylindrical inner shield sleeve 28 that extends over the telescopic shaft arrangement concentric with the assembly and has its end adjacent slots 27 snugly surrounding the cylindrical periphery of the mounting section.

In this manner sleeve 28 is supported by bell 22 and is detachably mounted on bell 22 by the axial snap-fit connection at 26, 27. Flange 24 fits frictionally rotatably in slot 25 whereby bell 22 and sleeve 28 are mounted for movement together to assume different positions about the axis of the assembly relative to the yokes and shafts.

At the other end of the assembly a shield bell 31 extends in the opposite direction from bell 22, being rotatably frictionally mounted on yoke 15 as by an internal flange 32 on its mounting section 33 fitting into an annular recess 34 on yoke 15. A plurality of flexible lobes or tangs 35 project from the mounting section into axial snap-fit locking arrangement with an outer cylindrical shield sleeve 36 at slots 37. Sleeve 36 is concentric with and preferably of slightly larger diameter than sleeve 28, and the end of sleeve 36 adjacent slots 37 is snugly fitted over the periphery of the bell mounting section, so that sleeve 36 is detachably supported by bell 31. The bell 31 and sleeve 36 may rotate together as a unit around the axis of the assembly.

Should any person or object contact the foregoing shield arrangement of bells and sleeves normally rotating with the drive mechanism enclosed thereby, such contact will result merely in slowed or stopped rotation of the shielding contacted and relative slippage between the shielding and the drive mechanism due to the frictional bearing mounting of the shield on the mechanism.

The foregoing shield assembly consisting of bell 22 and sleeve 28 effectively mounted on shaft 12, and bell 31 and sleeve 36 effectively mounted on shaft 14, is essentially the same as disclosed in copending application Ser. No. 468,291, filed June 30 1965, to which reference is made for any detail necessary to further understanding of the same.

At joint 18, a shield bell 41 of larger open end diameter than bell 22 extends over yoke 17 from an internal annular mounting flange 42 that may be frictionally rotatably mounted within an annular recess 43 in yoke 17. The open end mouths 44 and 45 respectively of oppositely extending bells 22 and 41 are axially spaced in the assembly to provide an annular gap indicated at 46. The purpose of this gap which extends circumferentially at about the center of the joint is to provide for ready access to the joint 18 without removal of the shield bells for lubrication and servicing.

An annular boot 47 extends around the axis of the assembly to surround the adjacent bell mouths and enclose gap 46. As illustrated, boot 47 has a generally spherical body contour with end flanges 48 and 49 that extend inwardly to provide sealing lips 51 and 52 respectively rotatably and slidably engaging the peripheral surfaces of the respective bells. The diameter of lip 51 is preferably larger than the diameter lip 52 engaging the smaller bell 22.

Boot 47 is preferably an integral semirigid member made of synthetic rubber molded to shape, with annular end flanges 48 and 49 substantially parallel and normally generally perpendicular to the axis of the sphere longitudinally of the assembly. The flanges 48 and 49 may elastically flex longitudinally of the assembly, and the lips 51 and 52 may elastically expand or contract in diameter to maintain surface engagement with the respective bells during changing angularity of joint 18 as will appear.

A bell unit 53 identical with bell 41 is rotatably frictionally mounted on the yoke attached to shaft 21. An annular boot 54 identical with boot 47 is mounted around the universal joint at the other end of the assembly 10 to peripherally surround bells 31 and 53 in the same manner as above described at joint 18.

Sleeves 28 and 36 are preferably integral cylindrical tubes made of a relatively lightweight stiff plastic such as polyethylene. Their peripheral surfaces are relatively smooth, and are imperforate except for the attachment slots 27 and 37, and in the assembly of FIGURE 1 these slots are effectively closed by the locking tangs 26 and 35.

Bells 22 and 31 are similar integral formations preferably molded from the same or equivalent lightweight plastic, and their internal mounting flanges are sized to fit frictionally snugly in the associated yoke grooves.

In some installations sleeves 28 and 36 may be thin walled sheet metal tubes, but preferably in all cases the bell, mounting member and locking tang units are of molded plastic.

Similarly bells 41 and 53 are molded stiff walled plastic units having their internal mounting flanges designed to fit frictionally and snugly within the associated yoke recesses. In some installations bells 41 and 53 may be sheet metal stampings.

Boots 47 and 54, on the other hand, are preferably molded units made of a normally shaped retaining but deformable material that will sustain the imparted spherical shape but will flex and adequately expand or contract at the lips engaging the smooth outer surfaces of the bells to retain annular sealing engagement with the bells during changing joint angularity in the assembly 10.

Boots 47 and 54 are sufficiently resiliently deformable especially at the end flanges that they may be deformed or stretched to be slipped endwise over the joint and allowed to relax into the FIGURE 1 position. While the flange 48 engaging the smaller bell may be made with a smaller lip diameter than flange 49 engaging the larger bell, both flanges 48 and 49 may be of about the same size since the relatively small difference between the outer diameters of the bells may be compensated for by the flexibility of the resilient flanges.

It is preferable in assembly that the flanges 48 and 49 of each boot be always under some compression generally radially of the boot to improve sealing contact with the bells.

Preferably both bells at each joint have external spherical surfaces centered about the center of the joint, and the associated boot has a correspondingly spherical body 47.

FIGURE 4 indicates a condition of extreme angularity in the drive assembly 10. During angularity the shafts 12 and 14 together with the bells 22 and 31 and the sleeves 28 and 36 all maintain their longitudinally aligned conditions. Similarly the bells 41 and 53 maintain their positions relative to the shafts 19 and 21 respectively. The bells at each end move relatively to assume angular positions within the boot during angularity. During increased angularity the ends of the smaller bells 22 and 33 may extend within the larger bells and the gap between the bells becomes appreciably wider at one side. During such angularity within limits the bells at each universal joint slide relatively within the resilient lips of the associated boots. During extreme angularity, sufficient for example to bring end flange 48 of boot 47 into abutment with the adjacent axially fixed end of sleeve 28, as at the point 55 indicated in FIGURE 4, the boot will be rotatively displaced on the bells rocking about an axis generally perpendicular to the axis of the assembly. Also the spherical body of the boot may flex under pressure due to the resiliency of the boot material to permit further angularity.

In all cases, the boots 47 and 54 are wide enough to maintain complete enclosure and coverage of the changing size and location gap between the open ends of the associated relatively movable bells, while the flexible end flanges of the boots retain sealing surface engagement with the respective bells. In practice it has been found that the foregoing arrangement provides for complete coverage of the joint during shaft angularity up to about 65°.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For a drive transmitting or like joint of the type wherein two end members are interconnected for relative angular movement; the improvement in protective external shielding for such joint that comprises opposed shield members fixed to the respective joint members and extending toward each other over the joint members to terminate in adjacent open ends, said opposed shield members being of different size whereby the smaller may extend into the larger during joint angularity and an annular shield member mounted upon and bridging said opposed shield members in sealing association with the external surfaces of said opposed shield members to provide and maintain enclosure of the joint by said shielding during all operative conditions of angularity of the joint.

2. In the invention defined in claim 1, said opposed shield members being bell-shaped units having their smaller ends axially secured on said joint end members.

3. In the invention defined in claim 2, said opposed shield members having rotative frictional mounting on the joint end members.

4. In the invention defined in claim 1, said annular shield member being an integral part made of flexible material having opposite internal end flanges in sliding engagement with the external surfaces of the respective opposed shield members.

5. In the invention defined in claim 1, said joint being of the type wherein the end members are yokes that are pivotally connected by a cross member and said yokes have annular recesses, and said opposed shield members being bell-shaped units having at their smaller ends internal flanges fitting within said recesses.

6. For a drive transmitting or like joint of the type wherein two end members are interconnected for relative angular movement; the improvement in protective external shielding for such joint that comprises opposed shield members mounted on the respective joint members and extending toward each other over the joint members to terminate in adjacent open ends, and an annular shield member mounted upon and bridging said opposed shield members in sliding association with the external surfaces of said opposed shield members to provide and maintain enclosure of the joint by said shielding during all operative conditions of angularity of the joint, said annular shield member being a flexible boot having opposite end flanges formed with internal lips frictionally engaging the external surfaces of the respective opposed shield members.

7. In the invention defined in claim 6, said end flanges being resilient to sealingly engage the surfaces of the respective opposed shield members.

8. For a drive transmitting or like joint of the type wherein two end members are interconnected for relative angular movement; the improvement in protective external shielding for such joint that comprises opposed shield members fixed to the respective joint members and extending toward each other over the joint members to terminate in adjacent open ends, and an annular shield member mounted upon and bridging said opposed shield members in sliding association with the external surfaces of said opposed shield members to provide and maintain enclosures of the joint by said shielding during all operative conditions of angularity of the joint, said opposed shield members being bell-shaped units having their smaller ends axially secured on said joint end members, and said annular shield member being an integral part having opposed end flanges extending into sliding engagement with the external surfaces of the respective bell-shaped units, at least one of said opposed shield members being composed of a relatively stiff material, and said annular shield member being a deformable unit composed of a resilient material such as synthetic rubber.

9. For a drive transmitting or like joint of the type wherein two end members are interconnected for relative angular movement; the improvement in protective external shielding for such joint that compirses opposed shield members axially fixed to the respective joint members and extending toward each other over the joint members to terminate in adjacent open ends and an annular shield member mounted upon and bridging said opposed shield members in sliding association with the external surfaces of said opposed shield members to provide and maintain enclosure of the joint by said shielding during all operative conditions of angularity of the joint, said opposed shield members having substantially spherical smooth outer surfaces, and said annular shield member having at opposite ends longitudinally of the joint compressed resilient circular lips providing and maintaining sliding sealing engagement with said external surfaces during angularity.

10. In the invention defined in claim 9, one of said opposed shield members being smaller than the other to extend freely within the other during joint angularity, and said lips being of different diameter corresponding to the surface engaged thereby.

References Cited

UNITED STATES PATENTS

| 1,410,791 | 3/1922 | Banks | 64—32 |
| 1,665,734 | 4/1928 | Clark | 64—32 |
| 3,053,062 | 9/1962 | Geisthoff | 64—4 |
| 3,083,549 | 4/1963 | Benson | 64—21 |

FOREIGN PATENTS 787,767   12/1957   Great Britain.

HALL C. COE, *Primary Examiner.*

U.S. Cl. X.R.

64—4